Oct. 27, 1942.  E. A. ROCKWELL  2,300,136
CONTROL FOR AUTOMOTIVE VEHICLES
Filed March 26, 1940  2 Sheets-Sheet 1
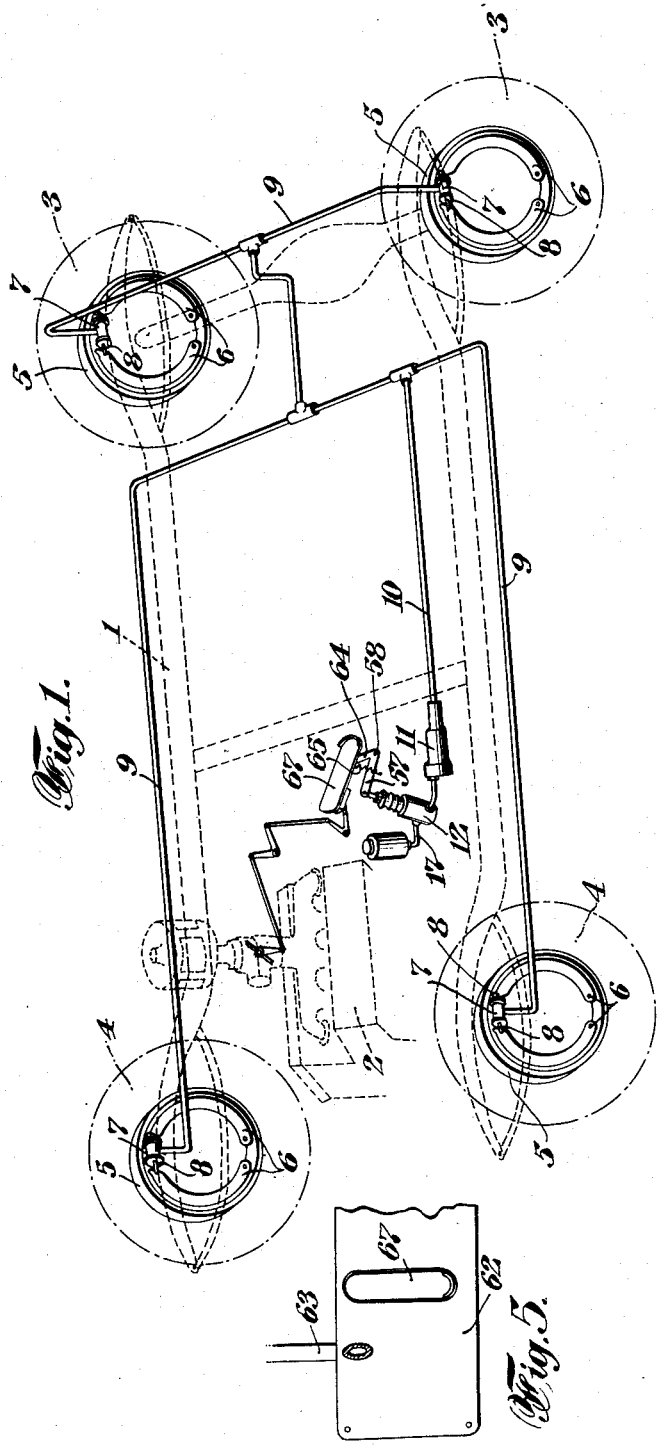
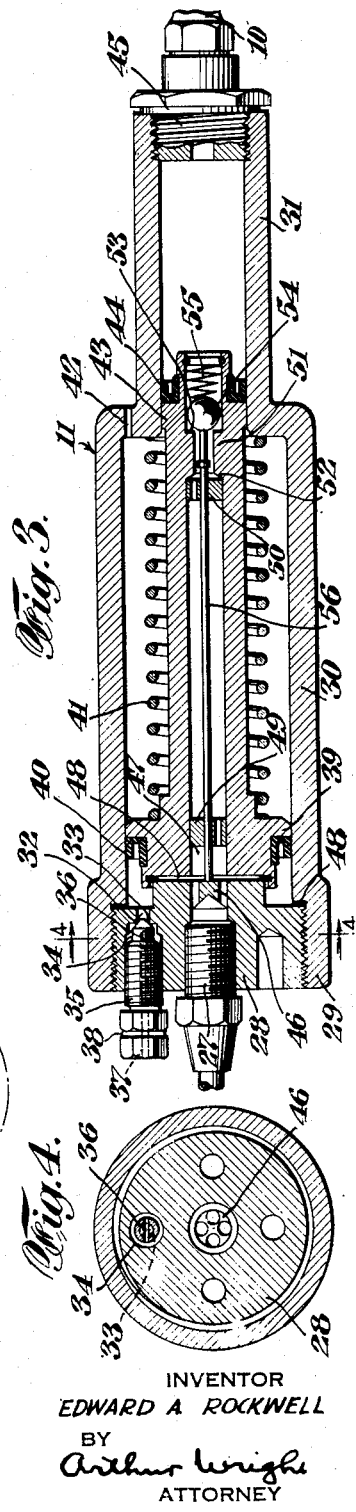
INVENTOR
EDWARD A. ROCKWELL
BY
Arthur Wright
ATTORNEY

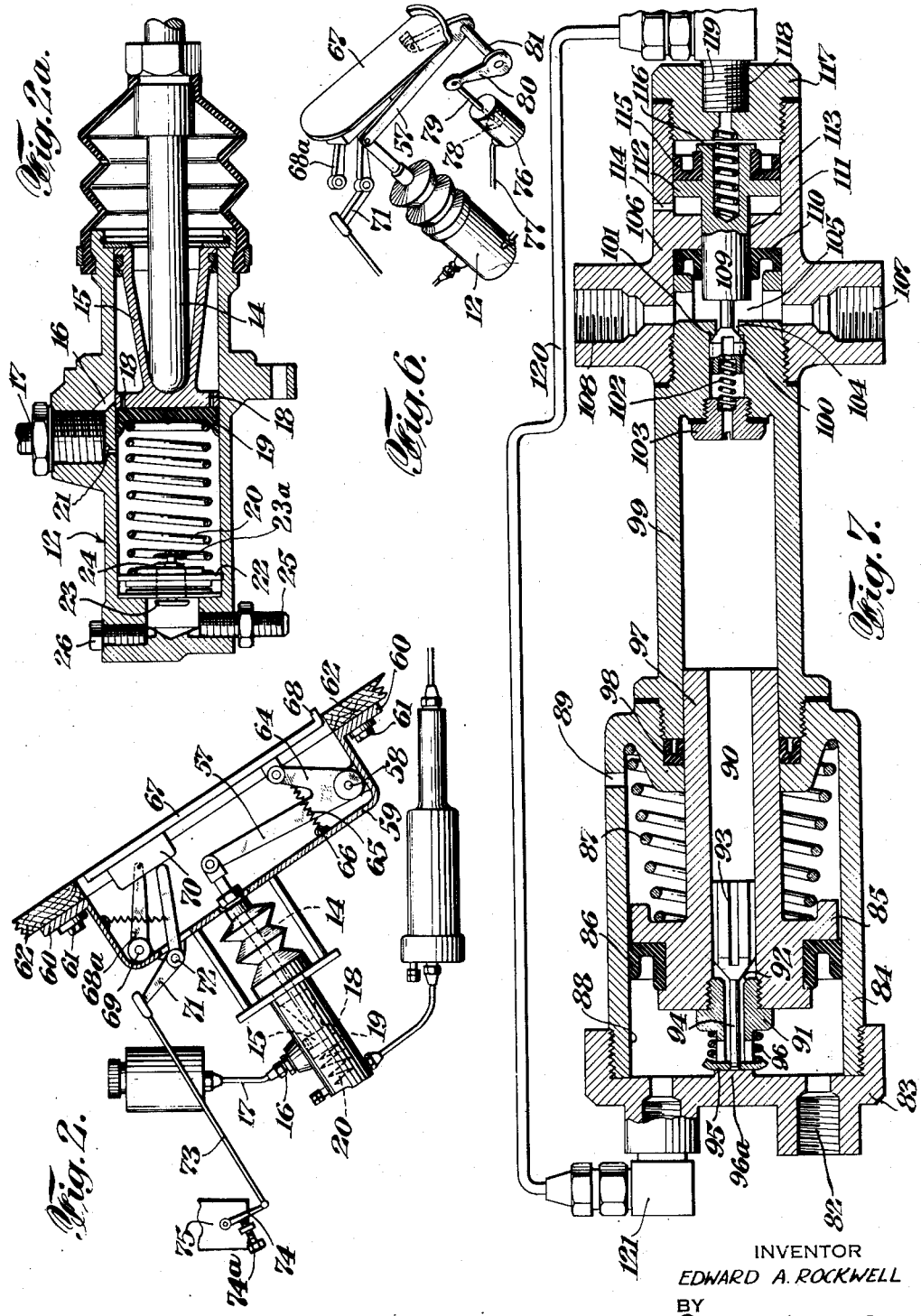

Patented Oct. 27, 1942

2,300,136

UNITED STATES PATENT OFFICE 2,300,136

CONTROL FOR AUTOMOTIVE VEHICLES

Edward A. Rockwell, West Hartford, Conn., assignor to The New Britain Machine Co., New Britain, Conn., a corporation of Connecticut Application March 26, 1940, Serial No. 326,040

9 Claims. (Cl. 192—3)

My invention relates particularly to an apparatus designed for controlling the operation of automotive vehicles driven by internal combustion engines or from any other source of power.

The object of my invention is to provide an apparatus giving an effective control for automotive vehicles by means of which the manual operation thereof is simplified. A further object is to thereby provide greater space for the driver of the automotive vehicle by eliminating projecting levers, which would otherwise encumber the same. A further object is to provide means whereby the manual power applied for operating one or more of the automotive accessories is controlled in such a manner as to initially apply low pressure liquid and thereafter, by gradual increase in the pressure, to subsequently apply a higher pressure liquid to the same. This change from low to high pressure is for the purpose of reducing the distance which the pedal is required to travel, thus keeping the pedal at all times in a position near to the level of the floorboard in which the pedal is mounted. This construction is especially advantageous as applied to the operation of brakes. Another object is to provide a means of the above character whereby an accessory, such, for example, as the brake, as well as the throttle of the engine, may be operated by the same manual actuating unit. Further objects of my invention will appear from the detailed description of the same hereinafter.

While my invention is capable of being embodied in many different forms, by way of illustration I have shown only certain forms thereof in the accompanying drawings, in which—

Fig. 1 is a diagrammatic perspective of an apparatus made in accordance with my invention;

Fig. 2 is a vertical section of the manual actuating unit for controlling the same;

Fig. 2a is a longitudinal section of the master cylinder;

Fig. 3 is a longitudinal section of the pressure converter used in connection therewith;

Fig. 4 is a section substantially on line 4—4 of Fig. 3;

Fig. 5 is an elevation of the floor-board in front of the driver's seat, showing the manual actuating control above referred to;

Fig. 6 is a diagrammatic elevation of a modified form of my invention; and

Fig. 7 is a longitudinal section of a modified form of converter which may be used therein.

Referring first to Figs. 1 to 5, in carrying out my invention I may provide an automobile chassis 1 having an internal combustion engine 2 arranged to drive in the usual way rear wheels 3, the front of the chassis being supported upon front wheels 4. Each of said wheels is provided with a brake-drum 5 having two semicircular brake-shoes 6 pivoted at their lower ends, said brake-shoes being adapted to be operated by means of a wheel brake-cylinder 7 having two fluid operated pistons 8 therein connected to the upper ends of said brake-shoes in the usual way. Piping 9 connects all of these brake cylinders together and a pipe 10 leads therefrom to a pressure converter 11 which in turn is connected to a master cylinder 12. The master cylinder 12 can be any desired type of master cylinder but may, for example, be of the character shown in the Boughton Patent No. 1,997,100, granted April 9, 1935. Or, instead, the master cylinder may be a Loughead construction, as shown in the drawings, comprised of a piston 15, operated by a rod 14, said cylinder 12 having a port 16 with a storage supply of fluid through a pipe 17. The piston 15 has longitudinal ports 18 which are adapted to transmit the fluid therethrough due to the suction created on the right in the withdrawal action of the piston 15, which liquid, in the same way, passes by the lip of a rubber cup 19 which tends to move to the right by reason of a coil spring 20 and which, in the right end of its path, permits the return of liquid by a port 21 to the storage supply. The coil spring 20 rests at the other end upon a valve supporting ring 22. The said ring has therein a double check valve 23, 23a normally pressed to the right by a small coil spring 24. An outlet fitting 25, leading to the brakes, is located in the end of the master cylinder. A bleeder plug 26 is also located in the end of the master cylinder. The liquid discharged under pressure from the master cylinder 12, as a result of the manual operation thereof, passes into an inlet opening 27 in a screwcap 28 in the pressure converter 11. The said cap 28 is carried in the end of a converter housing 29 having a large cylinder 30 and a small cylinder 31 therein. The said cap is furthermore provided with an air bleeder opening 32 communicating with the larger cylinder 30 and is normally closed by a conical end 33 of a screw plug 34 screwed into a screw sleeve 35 screwthreaded into said cap 28. The screw plug 34 has transverse ports 36 therein which communicate with a longitudinal port 37 in the same communicating with the outer air. The plug 34 and sleeve 35 serve to lock the conical end 33 on its seat normally with the aid of a lock washer 38. Within the large cylinder 30 there is a large piston 39 sealed by a sealing ring 40 of rubber or any other desired material, the said piston 39 being normally forced towards the left in Fig. 3 by a strong compression spring 41, the space to the right of the piston 39 being vented to the outer air by a breather opening 42. The small cylinder 31 carries within the same a small piston 43 integral with the piston 39 and which carries on its right-hand end a rubber seal ring 44. The small cylinder 31 is connected at said end thereof by a screw-threaded coupling 45 to the said pipe 10. The liquid as initially received through the port 27 passes through a ported stop boss 46 until it reaches an internal cylinder 47 within the piston 39. In advance of said cylinder 47 to the left there is carried a sealing gasket 48 cut away at the center to allow a small effective initial pressure tending to move the large piston 39, the opening in said gasket being slightly larger than the internal diameter of the cylinder 31, said cylinder 47 having two ported guides 49 and 50. The end of the cylinder 47 has a constricted portion 51 provided with a shoulder 52 for the plug 50 and a shoulder 53 which acts as a seat for a ball valve 54 pressed into closed position by a spring 55, one end of which is supported within the right-hand end of the small piston 43. This ball valve 54 in the retracted position of the large piston 39 is unseated by means of a rod 56 passing through the cylinder 47 and guides 49 and 50. The said rod 56 is of such a length that in the retracted position of the large piston 39 the left-hand end of the rod 56 will contact with the face of the boss 46 and press the ball valve 54 off its seat. In the subsequent movement of the piston 39 to the right the ball valve 54 will become seated due to the movement of the rod 56 away from the cap 28.

The said link 14, for operating the master cylinder 12, is connected to one end of a bell crank lever 57 carried by a pivot 58 on a box 59 having a flange 60 secured by screws 61 to an inclined stationary floor-board 62 located in front of the driver's seat and through which projects the usual steering column 63. Another arm 64 of the bell crank lever 57 is normally under a slight pressure downwardly by means of a tension coil spring 65 connected between said arm 64 and a hook 66 on the box 59. Furthermore, pivoted to said arm 64 there is a pedal 67 having a heel-supporting flange 68 at the lower portion thereof. As indicated in Figs. 2 and 5, the pedal 67 is flush with the surface of the floor-board 62. It will be noted that the arm 64 is thus pivoted to the lower portion of the pedal 67, the upper portion of said pedal being pivotally connected by means of a block 70 to an arm 68a carried by a pivot 69 on the box 59. The block 70 also rests against the end of a bell crank lever 71 supported by a pivot 72 on the box 59, to which is connected a throttle rod 73 leading to a throttle lever 74 having an adjustable stop 74a on an engine manifold 75. It will be noted from Fig. 5 that the only manual control aside from the steering column 63 is preferably the single pedal 67 which operates the brake and throttle, no clutch lever being needed as it will be understood that any desired type of automatically operating clutch, as, for instance, a hydraulically driven clutch, such as is shown in the Lysholm Patent No. 1,934,936, granted November 14, 1933, free from manual control, can be used for this purpose. Thus it will be seen that the floorboard 62 is free from the presence of any clutch operating element and the pedal 67 is flush with the floor-board 62, giving maximum space for the presence of the driver's feet. However, it will be understood that a clutch lever may pass through the floor-board 62 with the usual type of clutch but this, of course, could not have the advantages of the other construction just referred to.

Referring to the modified form of my invention in Fig. 6, the construction is the same as that previously described and shown in the preceding figures except in this instance instead of the spring 65 I have provided, for accomplishing a similar purpose to said spring but more effectively, a vacuum cylinder 76 connected by a pipe 77 to said engine manifold. Within the cylinder 76 there is a piston 78 which is connected by a link 79 to an arm 80 which is tight on a shaft 81 on which the bell crank lever 57 is carried so that in this way the bell crank lever 57 and arm 80 operate in unison.

In the modified form of the converter shown in Fig. 7, the liquid from the master cylinder enters through a port 82 in a cap 83 on a large cylinder 84. The cylinder 84 has therein a large piston 85 provided with a sealing ring 86 normally urged towards the left by a strong spring 87 in the cylinder chamber 88 connected to the outer air by a breather opening 89. The said large piston 85, furthermore, has a longitudinal passageway 90 therein in which there is screw-threaded a sleeve 91, the right-hand end 92 of which serves as a seat for a valve 93 which is connected to a rod 94 passing through the screw-threaded sleeve 91 but smaller than the opening in said sleeve. Upon the left end of said rod 94 there is fixed a ring 95 as a support for a spring 96 resting at its other end on the sleeve 91 so as to normally move the valve 93 to the left. The ring 95 is adapted to contact with a boss 96a on the inner face of the cap 83 so as to unseat the valve 93 when the large piston 85 is in the retracted position to the left. At the right the said piston 85 carries a smaller piston 97 extending through the end of the large cylinder 84, which latter carries a rubber ring seal 98. This small piston 97 passes, thence, into a small cylinder 99 screw-threaded to the cylinder 84. The other end of the cylinder 99 is normally closed by a valve 100 pressed against a seat 101 by a spring 102 supported by a ported screw-threaded plug 103. Said valve 100 controls the discharge of pressure liquid through a port 104 into a chamber 105 in a housing 106 connected by openings 107 and 108 to the wheel brakes for operating the latter. The said chamber 105, furthermore, is adapted to receive a plunger 109 which is sealed in the chamber 105 by a rubber ring seal 110. This small plunger 109 fits in an opening 111 through which it passes so as to be connected to a supplemental piston 112 operating in a cylinder 113 connected by a breather opening 114 to the outer air. On the right face of the piston 112 there is a rubber sealing ring 115 and within said piston 112 there is a coil spring 116 seated at the other end on a screw cap 117 on the end of the cylinder 113. The said cap has a threaded opening 118 in which there is screw-threaded a fitting 119 connected by a pipe 120 to a fitting 121 screw-threaded into the cap 83.

In the operation of my invention, referring first to Figs. 1 to 5, when it is desired to operate the automobile the engine 2 is started in the usual way after which, where an automatic hydraulic clutch is used, no manual clutch operation is required, but the automobile may now be driven and controlled by the operation of the single pedal 67. By the tilting of the pedal 67 forwardly at the top the throttle is controlled to accelerate the car and by the release of the same, followed by the tilting forwardly of the lower end of the pedal 67, the brakes will be brought into operation. This operation of the brakes is brought about through the pressure converter 11 in the following manner. Initially the liquid delivered from the master cylinder 12 passes into the opening 27 and thence through the passageway 47 past the valve 54 so as to move the brake shoes 6 into a position adjacent the brake-drums 5. When the manual pressure reaches this point and is thereafter increased, the result is to first seat the valve 54 by moving the piston 39 to the right, gradually forcing forward the liquid trapped in the small cylinder 31. This is followed by the further movement of the large piston 39 to the right in Fig. 3, thus converting the low pressure of the liquid at the left of said piston 39 to a high pressure liquid at the right of the small piston 43, and thus supplying the brakes with this high pressure liquid. Upon the release of the brakes the piston 39 returns to its initial position, simultaneously unseating the valve 54 and allowing an excess liquid to return in the reverse direction to the master cylinder 12. During this action of the brakes the tension spring 65 will have initially partially seated the brake-shoes 6 in position, thus tending to prevent any sudden or sharp action of the brakes, and also preventing delay in the operation of the same by the manual effort that has been applied. Also, the spring 65 will exert some action towards putting on the brakes in the final releasing movement of the accelerator.

The modification of my invention shown in Fig. 6 operates in a similar way. In this instance, however, the vacuum in the cylinder 76 will take the place of the action of the tension spring 65 to partially initially set the brake-shoes 6. The vacuum in this instance exerts some action towards putting on the brakes when the foot is being finally released from the depression of the accelerator when the engine is running. This form of my invention also has the effect of moving the foot up due to the spring so when the load and vacuum are low, thus acting as a governor.

In the operation of the modification of my invention shown in Fig. 7, the liquid from the master cylinder enters the converter through the port 82 and initially builds up a pressure within the cylinder 99 which, however, substantially does not move the large piston 85 due to the valve 93 being open. The initial build-up pressure, however, passes by the pipe 120 to the right face of the piston 112 which operates the plunger 109 so as to unseat the valve 100 and thus supply the liquid contained in the chamber 105 through the ports 107 and 108 to the wheel brakes for initially moving them into a position adjacent the brake-drums. As this manual pressure increases, however, the increased pressure on the left face of the large piston 85 will move the latter to the right, thus closing the valve 93 and thereafter producing a differentially greater pressure in the cylinder 99 which is supplied in increments, as desired, past the valve 100 to the brakes. In this way a gradual transition from the initial manual pressures applied for moving the brakes into position is produced, up to the high pressures used for producing the braking action on the brake-drums.

While I have described my invention above in detail I wish it to be understood that many changes may be made therein without departing from the spirit of the same.

I claim:

1. In combination, an automotive vehicle floor-board, a combined accelerator and brake-operating pedal located flush with the floor-board, a throttle-operating means and a brake-operating means connected to said pedal so that only one of these means can be operated at a given time, said brake operating means comprising a manual pressure means following through to the brake and means to magnify said manual pressure after the initial application of the manual pressure to the brake.

2. In combination, an automotive vehicle floor-board and a combined accelerator and brake-operating pedal located flush with the floor-board, said pedal having connected to one end thereof a throttle-operating means and to the other end thereof a brake-operating means for mutually exclusive alternate operation thereof said brake operating means comprising a manual pressure means following through to the brake and means to magnify said manual pressure after the initial application of the manual pressure to the brake.

3. In combination, an automotive vehicle floor-board and a combined accelerator and brake-operating pedal located flush with the floor-board, said pedal having connected to one end thereof a throttle-operating means and to the other end thereof a brake-operating means for alternate operation thereof, said brake-operating means including a device adapted to partially move the brakes into position before the manual application thereof.

4. In combination, a brake-operating pedal having a throttle operating means connected thereto and means for operating the brakes from said pedal alternatively to the operation of the throttle, comprising a device normally adapted to exert pressure to partially move the brakes into position before the manual application thereof.

5. In combination, a brake-operating pedal having a throttle operating means connected thereto and means for operating the brakes from said pedal alternatively to the operation of the throttle, comprising a spring normally adapted to exert pressure to partially move the brakes into position before the manual application thereof.

6. In combination, a brake-operating pedal having a throttle operating means connected thereto and means for operating the brakes from said pedal alternatively to the operation of the throttle, comprising a vacuum-operated device normally adapted to exert pressure to partially move the brakes into position before the manual application thereof.

7. A speed controlling mechanism comprising a brake, an accelerator, a pedal for operating the same substantially alternatively, and a fluid-pressure actuated means deriving vacuum from an engine manifold exerting a force towards applying the brakes in the releasing movement of the accelerator.

8. A speed controlling mechanism comprising an internal combustion engine, an accelerator therefor, a pedal for operating the same and controlling means including a part connected to the pedal and to the engine and a part connected to the pedal, for exerting a force against the foot pressure from the pedal when the load from the engine is low.

9. A speed controlling mechanism comprising an internal combustion engine, an accelerator therefor, a pedal for operating the same, and controlling means including a fluid pressure actuated part connected to the pedal and to the engine and a part connected to the pedal, for exerting a force against the foot pressure from the pedal when the load from the engine is low.

EDWARD A. ROCKWELL.